US012806449B2

(12) United States Patent
Schuhmacher et al.

(10) Patent No.: US 12,806,449 B2
(45) Date of Patent: Nov. 24, 2026

(54) ROPE BRAKE

(71) Applicant: MAMMUT SPORTS GROUP AG, Seon (CH)

(72) Inventors: Andreas Schuhmacher, Neu-Ulm (DE); Michael Sinner, Bad Groenenbach (DE)

(73) Assignee: MAMMUT SPORTS GROUP AG, Seon (CH)

( * ) Notice: Subject to any disclaimer, the term of this patent is extended or adjusted under 35 U.S.C. 154(b) by 290 days.

(21) Appl. No.: 18/564,019

(22) PCT Filed: May 24, 2022

(86) PCT No.: PCT/EP2022/064091
§ 371 (c)(1),
(2) Date: Nov. 24, 2023

(87) PCT Pub. No.: WO2022/248492
PCT Pub. Date: Dec. 1, 2022

(65) Prior Publication Data

US 2024/0238625 A1 Jul. 18, 2024

(30) Foreign Application Priority Data

May 25, 2021 (DE) ..................... 10 2021 002 712.4

(51) Int. Cl.
*A62B 1/14* (2006.01)
*A63B 29/02* (2006.01)

(52) U.S. Cl.
CPC ................ *A62B 1/14* (2013.01); *A63B 29/02* (2013.01)

(58) Field of Classification Search
CPC ......... A62B 1/14; A62B 35/0068; A62B 1/06; A63B 29/02
See application file for complete search history.

(56) References Cited

U.S. PATENT DOCUMENTS 7,533,871 B1 * 5/2009 Everett .................... A62B 1/14 254/408
8,316,989 B2 11/2012 Bamberg et al.
(Continued)

FOREIGN PATENT DOCUMENTS

CH 610 765 A5 5/1979
DE 10 2012 022 675 A1 5/2014
(Continued)

OTHER PUBLICATIONS

International Preliminary Report on Patentability and Written Opinion issued Nov. 21, 2023 in PCT/EP2022/064091 (submitting English translation only), 8 pages.
(Continued)

*Primary Examiner* — Kristen C Hayes
(74) *Attorney, Agent, or Firm* — Oblon, McClelland, Maier & Neustadt, L.L.P.

(57) ABSTRACT

A rope brake for increasing the rope friction when a climber falls is provided. The rope brake is attached to a belay point at a wall and has a guide element and a deflecting element with a securing section and a brake section, and the deflecting element is mounted rotatably. The rope is guided between the guide element and the deflecting element. A stop for limiting the movement of the deflecting element provides that the distance between the deflecting element and the guide element is throughout greater than the diameter of the rope. The deflecting element and the guide element are further arranged relative to each other such that the rope contacts the guide element and the brake section of the deflecting element in its braking position, but does not contact the brake section otherwise.

10 Claims, 3 Drawing Sheets

(56) References Cited

U.S. PATENT DOCUMENTS

| | | | | |
|---|---|---|---|---|
| 8,375,526 | B2 * | 2/2013 | Everett | A62B 1/14<br>24/132 R |
| 2011/0258815 | A1 * | 10/2011 | Everette | A62B 1/14<br>24/134 R |
| 2011/0315480 | A1 | 12/2011 | Maurice et al. | |
| 2020/0164232 | A1 * | 5/2020 | Mathe | A62B 1/14 |
| 2023/0414978 | A1 * | 12/2023 | Burke | F16D 59/00 |
| 2025/0312625 | A1 * | 10/2025 | Hung | A62B 1/14 |

FOREIGN PATENT DOCUMENTS

| | | | | |
|---|---|---|---|---|
| DE | 202018103664 | U1 * | 9/2019 | A63B 29/02 |
| EP | 2554219 | A1 * | 2/2013 | A63B 29/02 |
| WO | WO-9506500 | A1 * | 3/1995 | A62B 1/14 |

OTHER PUBLICATIONS

International Search Report mailed on Sep. 27, 2022 in PCT/EP2022/064091 filed on May 24, 2022 (3 pages).

* cited by examiner

ROPE BRAKE

The present invention relates to a rope brake for securing people and objects, in particular climbers, wherein the rope brake is provided in the belay system to reduce the energy in the event of the climber falling.

The popular sport of climbing has become increasingly popular, particularly in recent years. Climbing takes place both in climbing halls built for this purpose and in the open air on rock. To make the sport safer, the climber is secured by a belayer using a belay system to prevent a possible fall.

A popular variant of climbing is lead climbing. The belay system usually consists of a climbing rope or belay rope, which is gradually hooked in by the climber during the climb through belay points that are already in the wall or that are to be installed by the climber, for example in the form of carabiners. The rope is connected to both the climber and a belaying person, the belayer, so that the belayer secures the climber against falling using his own weight. The belayer usually stands at a distance of 1 to 2 meters from the wall.

The belay points are usually spaced a few meters apart, so that even when climbing above a belay point, the climber cannot fall too far. The last belay point into which the belay rope was hooked represents the belay point in which the rope is deflected in the event of a fall and the climber is held. If the climber is above the last belay point and falls, the fall height is at least twice the length of the distance to the last belay point. This ensures that the climber can fall at high speeds. A belay point usually consists of a hook attached to the wall and a carabiner attached to it into which the belay rope is hooked. Of course, other structures can also serve as a belay point.

Although the energy of the fall is reduced by the friction that the rope experiences at the belay points and through contact with the wall, significant forces still act on the belayer, who suddenly experiences high acceleration when the climber falls in this way and is pulled both towards the wall and upwards. For this reason, the weight difference between the climber and the belayer must not be too great.

To solve the problem, the weight of the belayer is often increased by additional weights such as sandbags, which are connected to the belayer. However, these must always be available, which causes difficulties, especially when climbing in nature.

So-called rope brakes offer a solution that can be used both in climbing halls and when climbing in nature. These increase the rope friction in the system and are therefore able to reduce the fall energy absorbed by the belayer, so that the risk of accidents for climbers and belayers can be reduced. An example of this is the rope brake disclosed in the patent CH 428 520 A. This permanently increases the rope friction in the system, so that in the event of a fall, less energy is applied to the belayer. However, such rope brakes have the disadvantage that increased rope friction is also generated when climbing, which makes it more difficult to tighten the rope and thus impairs the climber while climbing.

The publications DE102019000262B3 and DE102014001695B3 each show a rope brake which has a narrowing, wherein the rope is guided through the narrowing in the event of a fall and in this way increased rope friction also arises, but otherwise there are no restrictions for the climber.

The object of the present invention is to provide an alternative solution with which the difference in weight between two climbing partners can be compensated and which is easy to use, works safely in the event of a fall and does not hinder the climber during regular climbing.

This object is achieved by the subject matter of independent claim 1. Advantageous further developments are contained in the dependent claims.

The rope brake according to the invention for securing falling people or objects is attached to the climbing wall at a belay point, preferably at the belay point which is closest to the ground. It has a guide element which is designed to serve as a guide for a belay rope. The rope brake according to the invention also has a deflection element which has a fastening section and a braking section and is movably mounted. The belay rope is guided through between the guide element and the deflection element. The rope brake according to the invention also has a stop which is designed to limit the movement of the deflection element, wherein the stop is arranged such that the distance between the deflection element and the guide element is always greater than the diameter of the belay rope and this can thus be guided through between the guide element and deflection element. Furthermore, the deflection element and the guide element are arranged relative to one another such that the belay rope touches both the guide element and the braking section in a loaded state, but does not do so in an unloaded state such that a significant braking effect is brought about.

In the context of this application, a distinction is made between a loaded state of the rope brake and an unloaded state. The loaded state is the state that the rope brake assumes when the climber falls and his weight acts on the belay system. The unloaded state is therefore the opposite, i.e. when the climber's weight does not affect the belay system and thus the rope brake. In the unloaded state, the rope brake at the belay point substantially hangs downwards in the direction of the belayer due to gravity and the belay rope is guided through the rope brake. When in the unloaded state, the rope is not under tension.

This changes the moment the climber falls into a belay point above the rope brake. The effect of the weight causes the rope to experience tension and due to the distance between the belayer and the wall, the orientation of the rope brake changes in relation to the climbing wall and now substantially points towards the second belay point and therefore generally upwards.

In this state, the belay rope is deflected by the deflection element and now rests on the braking section on one side and on the guide element on the other side. The additional deflection increases the friction in the system and thus dissipates part of the climber's fall energy, i.e. converting it into heat. The remaining energy that has to be absorbed by the belayer can thus be reduced. In this way, safety can be increased and the permissible weight difference between the climber and the belayer can be increased.

In an advantageous embodiment of the rope brake according to the invention, the deflection element is mounted on the rope brake so that it can rotate about a point of rotation. Although other forms of mounting, for example a linear mounting, are also conceivable for the deflection element, a rotational mounting around a point of rotation enables a simple and at the same time stable structural implementation.

An advantageous embodiment of the rope brake according to the invention has an additional element which is arranged such that the belay rope rubs against the guide element, the braking section of the deflection element and the additional element in the event of a fall into the rope brake itself. In the event of a fall into the rope brake itself, make sure that the rope friction that occurs in the event of a fall into a belay point above the rope brake is not between the carabiner of the belay point and the belay rope that runs through there. The friction in the rope brake must therefore be increased in order to achieve the same safety of the system as in the event of a fall into a belay point above the rope brake. This is ensured by the additional friction on the additional element when falling into the rope brake itself.

In a further embodiment of the invention, the rope brake has a second guide element, wherein the guide element, the deflection element and the second guide element are arranged relative to one another such that the belay rope rubs in the loaded state against the guide element, the braking section of the deflection element, and the second guide element. In this way, the rope friction can be further increased and even more energy can be dissipated if the climber falls. It is also conceivable to provide additional guide elements in order to further increase the effectiveness of the brake.

Embodiments with an additional element or a second guide element are particularly advantageous if the deflection element and the additional element or the second guide element are arranged such that the distance between the braking section of the deflection element and the additional element or the second guide element is always larger than the diameter of the belay rope. This makes it possible to prevent the belay rope from becoming trapped in the rope brake, particularly in the unloaded state, and thus hindering the climber while climbing.

In a further advantageous embodiment of the invention, the rope brake has an opening element, for example in the form of a rubber, a spring or another elastic element, which is configured to exert a force on the deflection element such that the distance between the braking section and the guide element is enlarged. The fact that the distance mentioned can change is due to the movable mounting of the deflection element. Depending on the type of mounting, it enables the deflection element and thus also the braking section to move in a translational or rotational manner. By providing an opening element, the risk of the climbing rope becoming jammed in the rope brake when unloaded can be minimized. In the loaded state, the climber's weight, which then acts on the system, overcomes the applied force of the opening element.

In a further advantageous embodiment of the invention, the rope brake can be opened at least at one point such that the belay rope can be inserted into the rope brake and positioned there. An opening can be realized, for example, using a joint and a latching mechanism. However, it is essential that the opening can be securely closed to prevent the belay rope from slipping out while climbing. The opening makes it easy to install the rope brake in the belay system. If the rope brake is attached to the belay point, the rope can easily be inserted into the open rope brake without having to be detached from the climber and threaded through the rope brake and reattached to the climber. Safety and comfort can be significantly increased in this way.

In a further advantageous embodiment of the invention, the distance between the fastening section of the deflection element and the braking section can be changed. In this way, the geometry of the rope brake and thus also the path of the belay rope through the rope brake can be changed. By changing the path of the belay rope, the contact surface between the rope and the braking section or the guide element is changed, whereby the rope friction and thus the braking effect can be adjusted according to the weights of the climber and the belayer. The friction effect of the brake increases when the distance between the fastening element and the braking section is increased and the rope is therefore deflected more.

Furthermore, an embodiment of the invention is advantageous in which the positions of the deflection element and the guide element can be adjusted in relation to one another and in this way the geometry of the rope brake can be changed. As described in the previous paragraph, the braking effect of the rope brake can also be influenced by changing the geometry and in this way can be adjusted to the respective weight difference between the climber and the belayer.

Of course, in embodiments that have an additional element and/or a second guide element, it is also conceivable to enable a change in the position of the additional element and/or the second guide element in relation to the positions of the guide element and the deflection element. Thus, the positions of all elements (guide element, deflection element, second guide element, additional element) can be adjusted to one another and the rope brake can therefore be optimally adapted to the needs of the respective athlete. The possibility of changing a position of one of the elements mentioned can be realized, for example, via an eccentric shape of the corresponding element, whereby the element can be rotated in order to create different geometric configurations.

In an advantageous development of the invention, the braking section has a round shape at its end, which is in contact with the belay rope in the loaded state. In this way, rope wear can be minimized.

It is also possible to provide the contact surface between the braking section and the belay rope with a rough surface or small serrations aligned to optimize friction in order to increase the rope friction and thus the braking effect. However, in these embodiments there would be higher rope wear.

In a further embodiment of the invention, the rope brake has a second stop, which is designed to limit the movement of the deflection element such that the distance between the fastening section and the guide element is always greater than the diameter of the belay rope. Embodiments are also conceivable in which the first and second stops are structurally secured by a component. In this way, jamming of the belay rope can be effectively prevented in order to minimize the risk of the climber being hindered by the rope brake.

The invention is explained in more detail below with reference to the attached figures.

Figure 1:
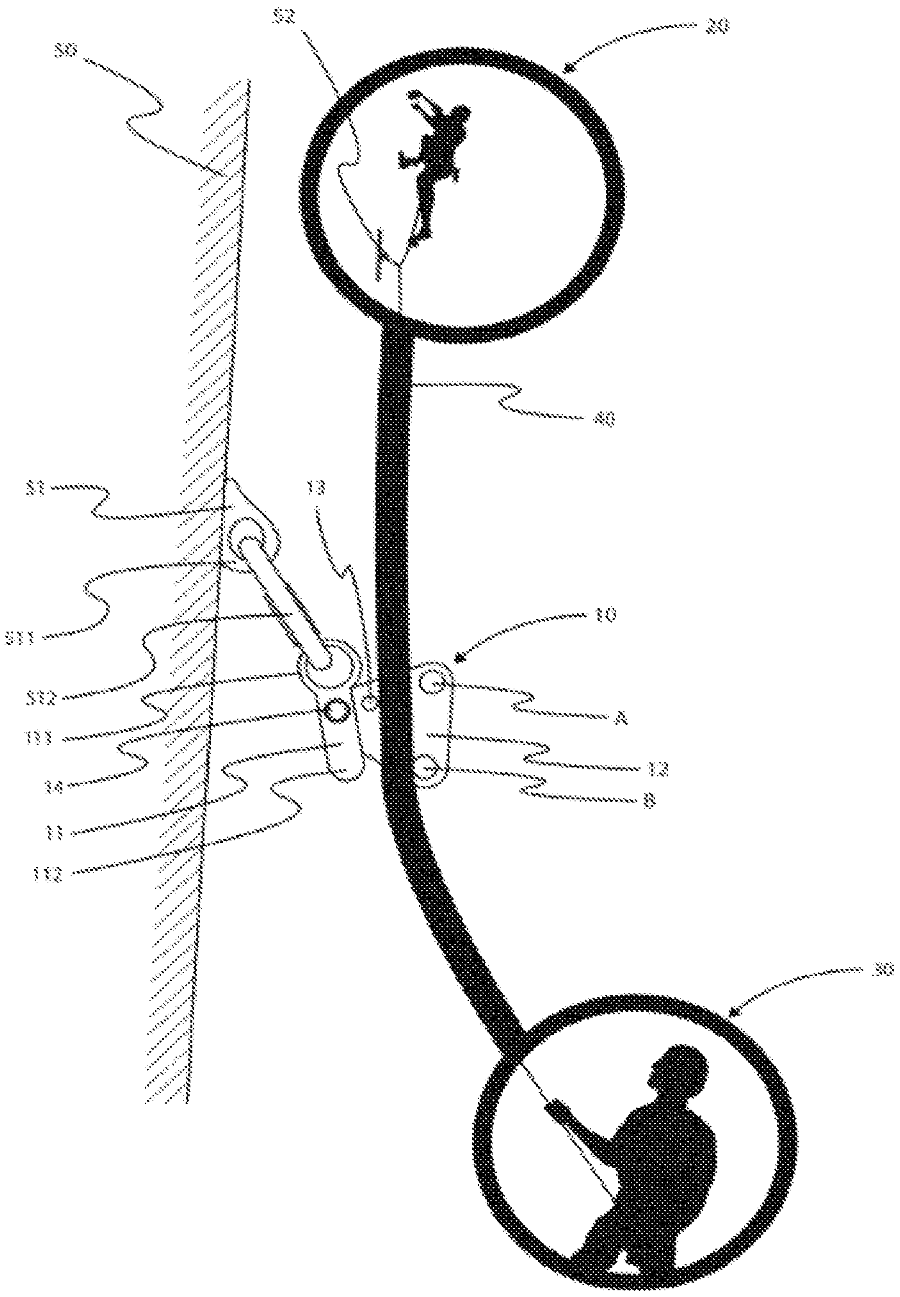
FIG. 1 shows an embodiment of the rope brake according to the invention in the unloaded state.

FIG. 1 shows an embodiment of the rope brake 10 according to the invention in the unloaded state. A climber 20 climbs a wall 50 and is secured by a belayer 30. The rope brake 10 is fastened in a first belay point 51 provided on the wall 50. The first belay point 51 is the belay point that is furthest from the ground. On the way up the wall 50, the climber 20 passes a plurality of belay points 51, 52, into which he hangs a belay rope 40 to secure himself. The last belay point into which the climber 20 hung the belay rope 40 is referred to as the current belay point 52. This catches the climber 20 if he falls.

The first belay point 51 consists of a securing hook 511 and a carabiner 512. The rope brake 10 is attached to the carabiner 512. In other embodiments, types of belay points are also conceivable, in which, for example, a textile connecting piece is provided between the securing hook 511 and the carabiner 512. The climber usually attaches a carabiner 512 to each securing hook 511 when climbing up along the wall. In order to simplify the installation of the rope brake 10, the rope brake 10 can already be attached to the carabiner 512 on the ground, whereby only the carabiner 512 has to be hooked into the securing hook 511 when climbing up.

The rope brake 10 consists of a deflection element 11, a guide element A, an additional element B and a stop 13, each of which is arranged in a housing 12. In this embodiment, the housing 12 consists of two plates, between which the elements mentioned are arranged.

The rope brake is shown in a sectional view, in which the one plate of the housing 20 that is inclined towards the viewer is cut off in order to enable a view of the inner workings of the rope brake 10. The rope brake 10 can be opened by rotating one of the plates in order to be able to easily insert the belay rope 40 into the rope brake 10.

The deflection element 11 in turn consists of a fastening section 111 shaped as a ring and a braking section 112 opposite the fastening section. The deflection element 11 is rotatably mounted in the housing 12 using a point of rotation 14. The belay rope 40 is guided between the deflection element 11 and the guide element A through the rope brake 10, wherein the additional element B is on the side of the guide element A and the stop 13 on the side of the deflection element 11. At the point of rotation 14 of the deflection element 11, an opening element designed as a torsion spring is provided, which exerts a rotational force on the deflection element 11, so that it is rotated clockwise in the plane of the drawing, in order to ensure the opening for the belay rope 40.

In the unloaded state shown in FIG. 1, the rope brake 10 hangs pointing downwards in the direction of the belayer due to its weight. The belay rope 40 is held under low tension by the belayer 30 without pulling the climber 20 downwards, so that the climber 20 can climb up the wall 50 without hindrance. When climbing upwards, he can easily pull the belay rope 40 through the rope brake 10 without it getting jammed or experiencing any other significant resistance.

Figure 2:
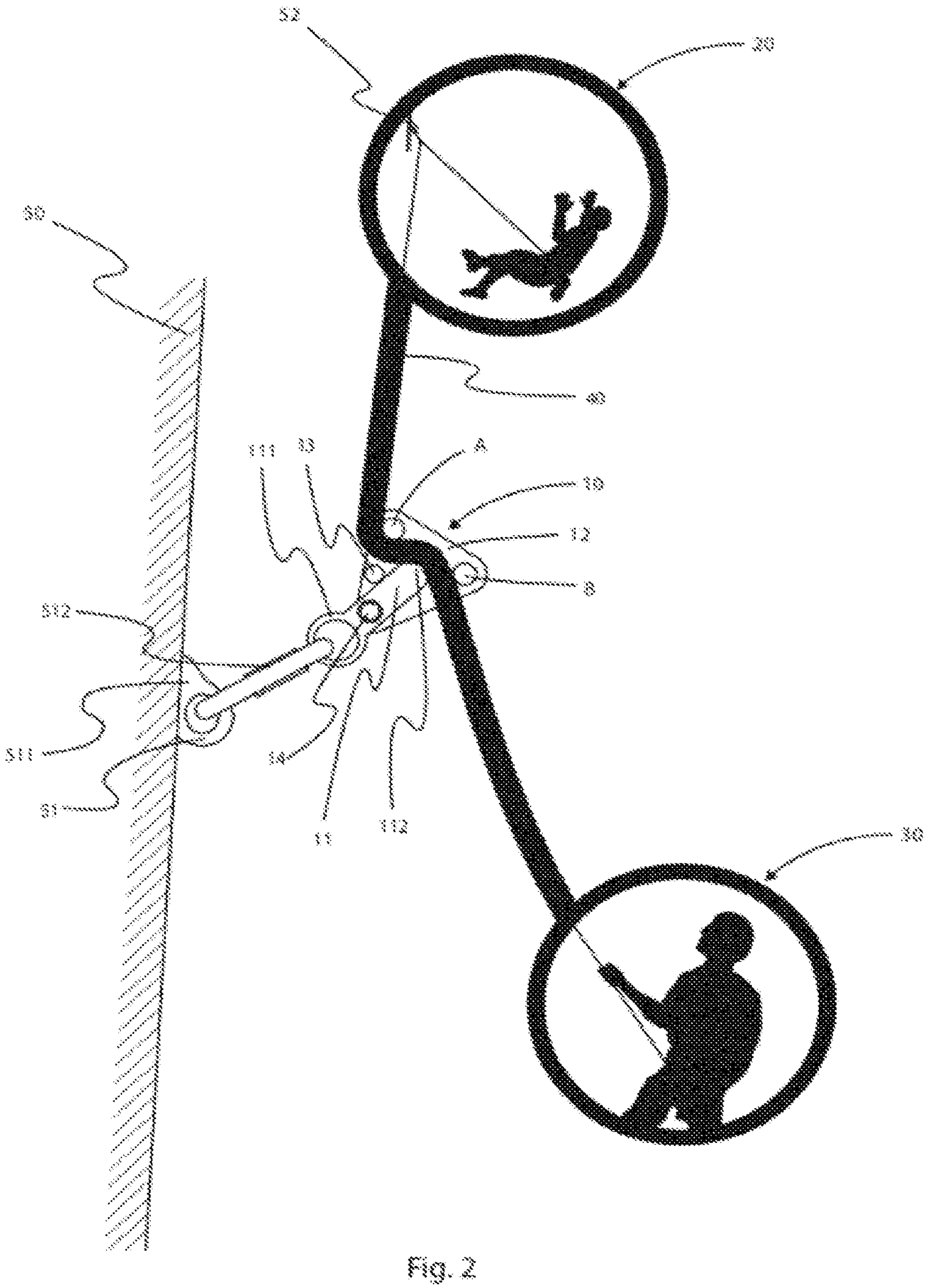
FIG. 2 shows the embodiment of the rope brake according to the invention shown in FIG. 1 in a loaded state.

FIG. 2 shows the embodiment of the rope brake 10 according to the invention shown in FIG. 1 in a loaded state. Since the illustrations from FIG. 1 and FIG. 2 only differ in that the belay system with the rope brake 10 is present in the unloaded state and once in the loaded state, only the differences between the two figures will be discussed.

Due to the fall of the climber 20 indicated in FIG. 2, the belay rope 40 is tensioned and deflected in the current belay point 52, so that the climber 20 hangs on one side of the current belay point 52 and on the other side there is a connection through the rope brake 10 to the belayer 30. Due to the tension of the belay rope 40 and the geometry of the arrangement, the rope brake 10 is aligned upwards in the direction of the climber 40 or in the direction of the belay point following the first belay point 51. As a result, the belay rope 40 is deflected by 90 degrees on the guide element A, which is designed as a cylinder between the two plates of the housing 12, which creates friction between the belay rope 40 and the guide element A.

Due to the load on the rope brake 10, the deflection element 11 is rotated about the point of rotation 14 against the force of the opening element, so that it rests on the stop 13. The stop 13 prevents the belay rope 40 from being caught between the guide element A and the deflection element 11. By changing the position of the deflection element 11, the belay rope 40 is deflected again and then extends from the deflection element 11 in a direct path towards the belayer 30. This further deflection of the belay rope 40 creates friction on the braking section 112, which further takes the energy out of the belay system.

When climbing without a rope brake 10, the belay rope 40 would be guided directly through the carabiner 512 of the lowest belay point 51. The rope friction that arises in such a system therefore corresponds approximately to the friction that exists between guide element A and belay rope 40 in the system with rope brake 10. The friction occurring on the braking section 112 thus additionally reduces the energy to be absorbed by the belayer 30 compared to climbing without a rope brake 10. This can both increase safety and create the possibility for significantly lighter climbing partners to be able to belay their heavier climbing partners.

Embodiments of the invention are conceivable in which the positions of the guide element A or the point of rotation 14 of the deflection element 11 can be changed in order to thus adjust the wrap angle of the belay rope on the guide element A and braking section 112. In addition, it is also possible to change the length of the deflection element 11 so that the braking section 112 is located further away from the point of rotation 14. In this way,
the wrap angle and thus the braking effect of the rope brake 10 can also be influenced.

Figure 3:
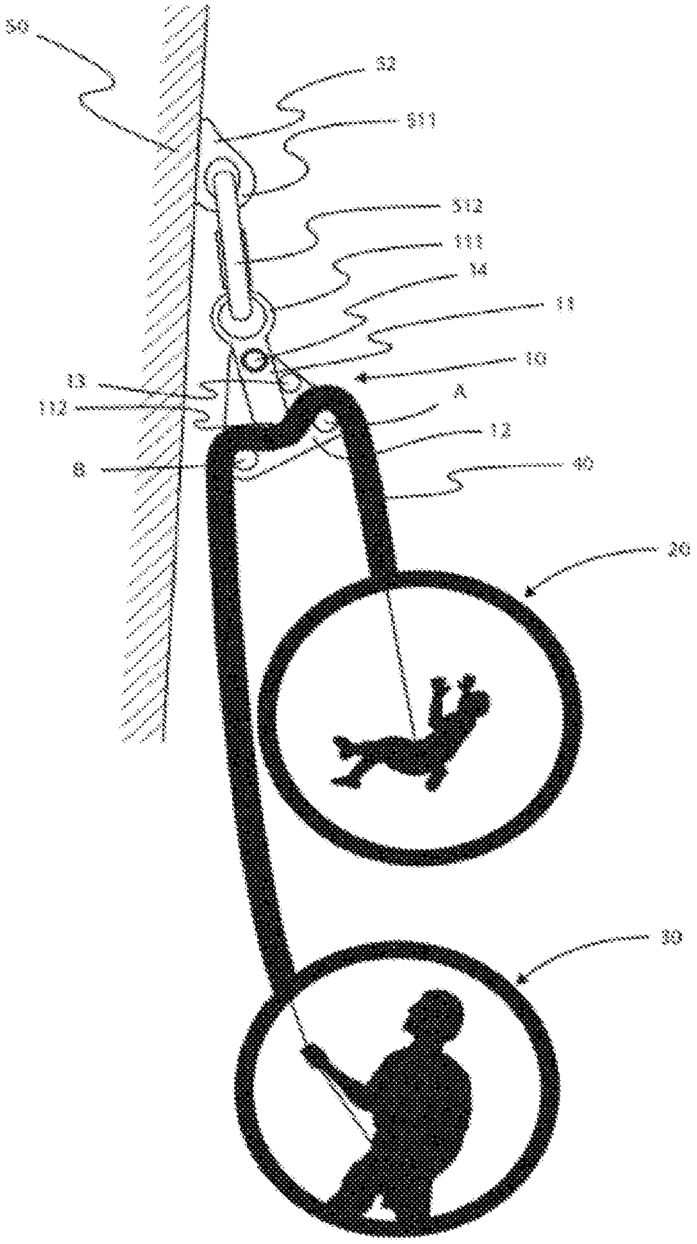
FIG. 3 shows the embodiment of the rope brake according to the invention shown in FIG. 1 in the loaded state when falling into the rope brake itself.

FIG. 3 shows the embodiment of the rope brake 10 according to the invention shown in FIGS. 1 and 2 in the loaded state when falling into the rope brake 10 itself. The climber 20 falls before he can attach the belay rope 40 to the next belay point 51. Here too, due to the identical embodiments of the rope brake 10 between FIGS. 1 to 3, only the differences from the previous figures will be discussed.

The fall into the rope brake 10 itself does not produce any force that changes the orientation of the rope brake 10. As shown in FIG. 1, in FIG. 3 it is also oriented towards the belayer and thus towards the ground, wherein the end of the belay rope 40 is with the climber 20 on one side of the rope brake and the end of the belay rope 40 is with the belayer 30 on the other side.

By falling into the rope brake 10 itself, a force acts on the deflection element 11, so that it rotates around the point of rotation 14 until it hits the stop 13. The belay rope is initially deflected by the guide element A starting from the climber and in turn deflected to the belayer 30 by the second guide element B. The braking section 112 of the deflection element 11 protrudes between guide element A and guide element B to such an extent that the belay rope 40 is deflected by the braking section 112 in addition to the deflections on the guide elements A and B. This creates friction both during the deflection on the guide elements A and B and on the braking section 112.

In comparison to a belay system without a rope brake 10, in which the belay rope 40 would be guided through the carabiner 512, friction would only arise due to the deflection on the carabiner 512. This would roughly correspond to the friction that occurs on the guide elements A and B in the belay system with rope brake 10. In the latter case, however, there is additional friction on the braking section 112, which creates an additional braking effect. Thus, even if you fall into the rope brake 10, safety can be increased and a larger weight difference between the climbing partners can be made possible.

LIST OF REFERENCE NUMERALS

10 rope brake
11 deflection element
111 fastening section
112 braking section

12 housing
13 stop
14 point of rotation
A guide element
B additional element
D second guide element
20 climber
30 belayer
40 belay rope
50 wall
51 first belay point
511 securing hook
512 carabiner
52 current belay point

The invention claimed is:

1. A rope brake for increasing a rope-friction during a fall of a climber for reducing a fall energy absorbed by a belayer, wherein the rope brake is fastened in a belay point of a climbing wall, the rope brake comprising:

a guide element, designed to guide a belay rope; and a deflection element, which has a fastening section and a braking section and is movably mounted, wherein the belay rope is guided through between the guide element and the deflection element, wherein, when the weight of the climber does not set the rope under tension, the rope does not contact the braking section of the deflection element, wherein the rope brake further has a stop configured to limit the movement of the deflection element, the stop is arranged such that the distance between the deflection element and the guide element is always larger than the diameter of the belay rope, and the deflection element and the guide element are arranged relative to one another such that the belay rope touches both the guide element and the braking section in a loaded state.

2. The rope brake according to claim 1, wherein the deflection element is rotatably mounted on the rope brake about a pivot point.

3. The rope brake according to claim 1, wherein the rope brake has a second element, which is arranged such that in the event of a fall into the rope brake itself, the belay rope rubs against the guide element, the braking section and the second element.

4. The rope brake according to claim 3, wherein the deflection element and the second element or guide element are arranged such that the distance between the braking section and the second element or the second guide element is always larger than the diameter of the belay rope.

5. The rope brake according to claim 1, wherein the rope brake has at least a second guide element, wherein the deflection element, the guide element and the second guide element are arranged relative to one another such that the belay rope in the loaded state rubs against the guide element, the braking section and the second guide element.

6. The rope brake according to claim 1, wherein the rope brake has an opening element which is configured to exert a force on the deflection element such that the distance between the braking section and the guide element is enlarged.

7. The rope brake according to claim 1, wherein the rope brake can be opened in at least one place such that a positioning of the belay rope within the rope brake is made possible.

8. The rope brake according to claim 1, wherein the distance between the fastening section of the deflection element and the braking section can be changed.

9. The rope brake according to claim 1, wherein the positions of the deflection element and the guide element are adjustable in relation to one another.

10. The rope brake according to claim 1, wherein the rope brake further has a second stop, configured to limit the movement of the deflection element, wherein the second stop is arranged such that the distance between the fastening section and the guide element is always greater than the diameter of the belay rope.

* * * * *